July 29, 1958

C. F. BALL 2,845,250

CHUCK MECHANISM FOR OIL WELL DRILLING APPARATUS

Filed Sept. 1, 1953

Inventor:
Charles F. Ball
by Charles F. Osgood,
Attorney

July 29, 1958 C. F. BALL 2,845,250
CHUCK MECHANISM FOR OIL WELL DRILLING APPARATUS
Filed Sept. 1, 1953 3 Sheets-Sheet 3
Fig. 3.
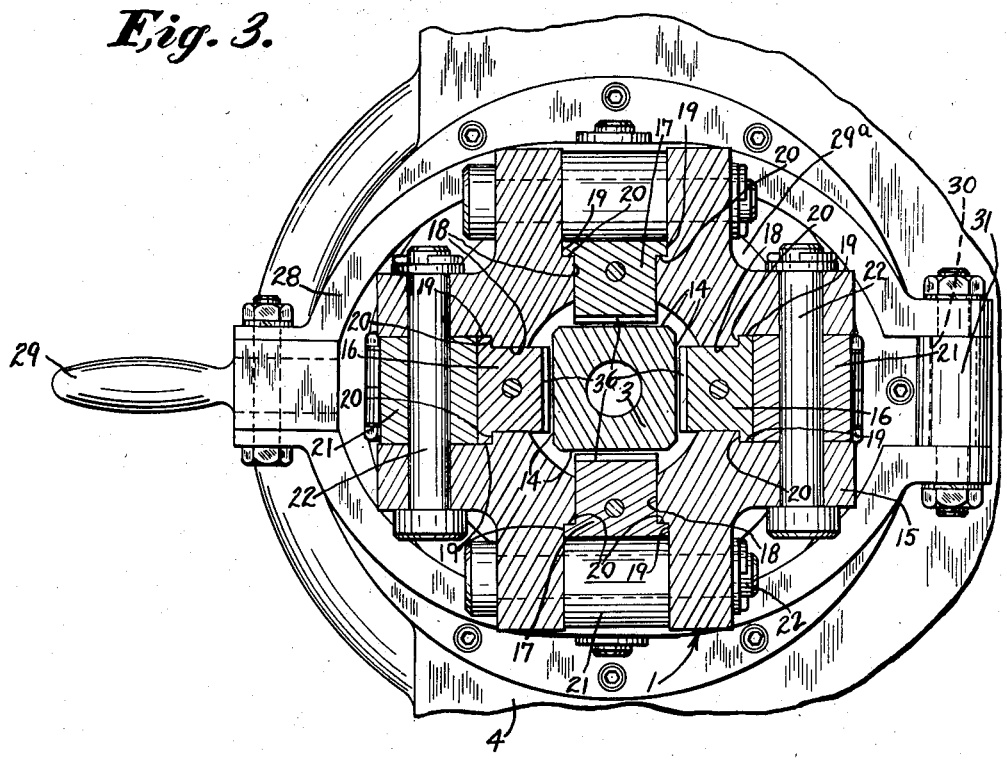
Fig. 4.
Fig. 5.
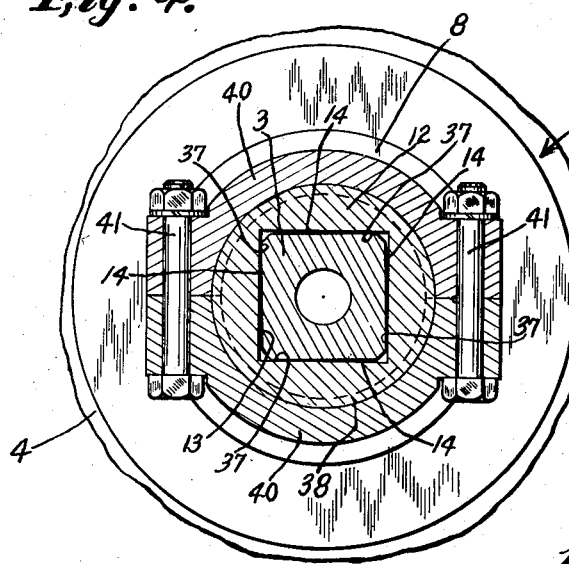
Inventor:
Charles F. Ball
by Charles F. Osgood,
Attorney United States Patent Office
2,845,250
Patented July 29, 1958

2,845,250

CHUCK MECHANISM FOR OIL WELL DRILLING APPARATUS

Charles F. Ball, Franklin, Pa., assignor to Joy Manufacturing Company, Pittsburgh, Pa., a corporation of Pennsylvania Application September 1, 1953, Serial No. 377,843

11 Claims. (Cl. 255—23)

This invention relates to chuck mechanisms and more particularly to a chuck mechanism especially designed for association with the rotation mechanism of oil well drilling apparatus.

The present invention relates to an improvement over that of the Ball and Luce Patent No. 2,638,324, dated May 12, 1953, and owned by the assignee of the present invention. In a chuck mechanism in which the chuck rotates with the driver of the rotating mechanism for the kelly or drill pipe, the driving surfaces of the kelly or pipe are not always in exact angular alignment or registry with the chuck paws so that the latter do not properly engage the kelly or pipe, and such a condition is particularly true when wear of the driver occurs and a kelly or pipe of polygonal cross section is used, preventing proper concurrent engagement of the driver and the chuck jaws with the flat sides of the kelly or pipe. The present invention contemplates improvements over chuck mechanisms of known types in that the chuck is freely rotatable about an axis aligned with the driver axis of the rotation mechanism so that the chuck jaws always properly engage the flat driving surfaces of the kelly or pipe irrespective of the engagement of the driver with the kelly or pipe. In other words, in the present invention, the chuck jaws squarely engage the flat sides of the kelly or pipe irrespective of the manner of engagement of the driving surfaces of the driver with the flat sides of the kelly or pipe, even when the coacting driving surfaces of the driver and the kelly or pipe have substantial clearances or are substantially worn.

An object of the present invention is to provide an improved chuck mechanism. Another object is to provide an improved chuck mechanism especially designed for association with the rotation mechanism of oil well drilling apparatus, wherein the chuck jaws and the driver of the rotation mechanism always properly engage the drill pipe or kelly. Yet another object is to provide an improved chuck mechanism having a driver on which a chuck is mounted and including mounting means for the chuck for permitting rotation of the chuck relative to the driver about the axis of rotation of the driver so that the chuck jaws always may properly engage the drill pipe or kelly. These and other objects and advantages of the invention will, however, hereinafter more fully appear.

In the accompanying drawings there are shown for purposes of illustration one form which the invention may assume in practice.

In these drawings:

Fig. 3 is a cross section taken on line 3—3 of Fig. 2, showing the chuck details.

Fig. 4 is a cross section taken on line 4—4 of Fig. 2, showing details of the rotation mechanism.

Fig. 5 is a schematic view showing the manner of cooperation of the driver bushing and kelly.

Figure 1:
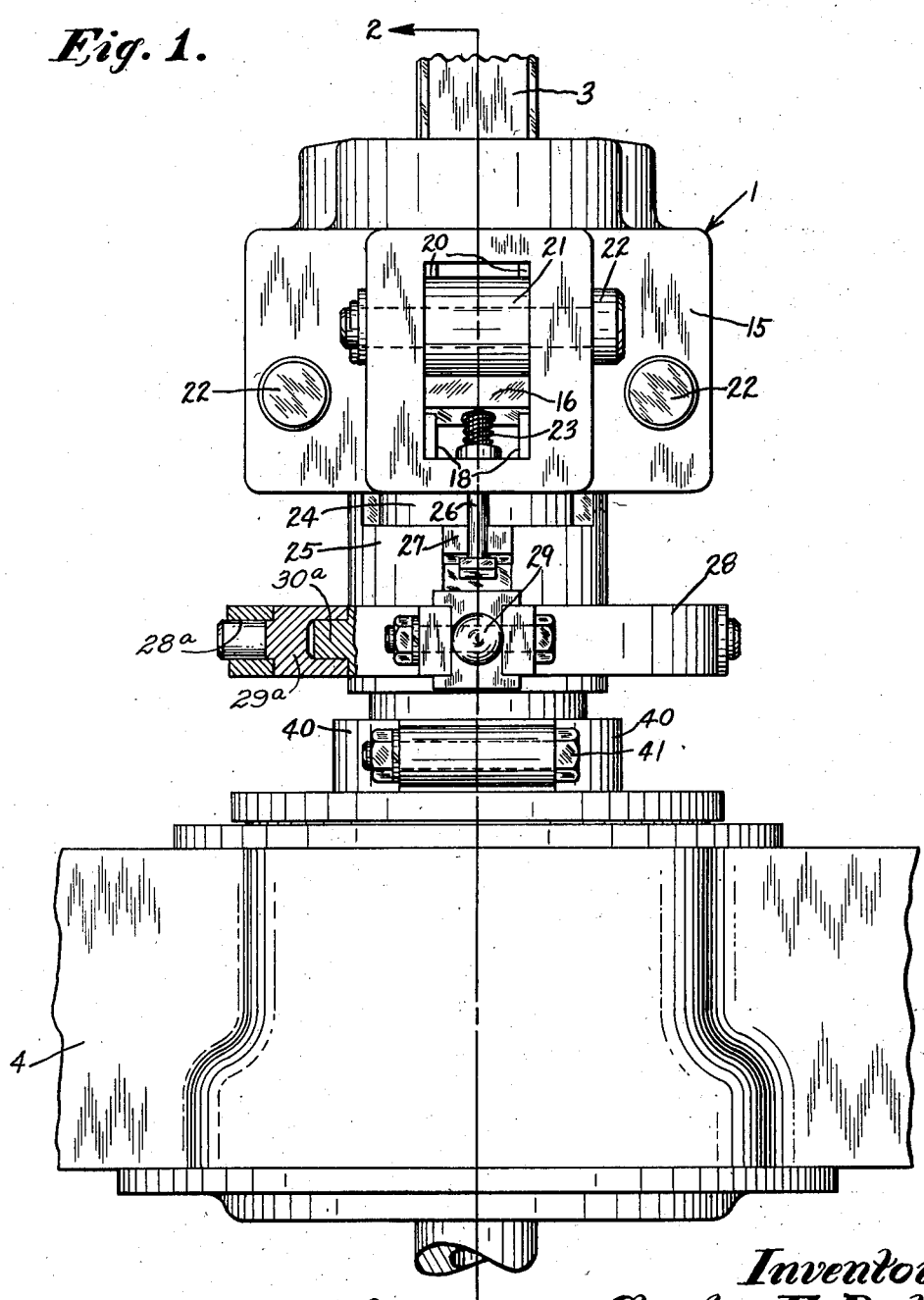
Fig. 1 is a side elevational view of a chuck mechanism constructed in accordance with a preferred illustrative embodiment of the invention.

The mechanism is generally designated 1 and the rotation mechanism is generally designated 2, and the latter is associated with a hydraulic feeding mechanism such as that disclosed in the Ball and Luce patent above referred to. The hydraulic feeding mechanism, as disclosed in the patent, is operable to effect axial movement of the chuck and rotation mechanisms bodily in unison upwardly and downwardly along a rectilinear path, and the chuck mechanism includes oppositely acting chuck jaws selectively positionable to engage and grip a conventional kelly or drill pipe 3 depending upon the direction of feed. The chuck jaw arrangement and the jaw positioning and releasing means may be the same as those shown in the Ball and Luce patent.

The hydraulic feeding mechanism of the patent is effective to move a cross frame or sliding cross head 4 either upwardly or downwardly along a rectilinear path, and the chuck and rotation mechanisms are mounted on this cross frame. The cross frame has a chamber 5 in which a driving gear 6 is arranged, and this gear is driven in a suitable manner and is journaled on combined radial and thrust bearings 7 supported within the cross frame. This driving gear has a sleevelike hub 8 secured as by screws 9 to the bottom flange of a sleeve 10 fitted within the gear hub, and the sleeve 10 is keyed at 11 to a driver or drive bushing 12. This drive bushing has a square drive opening 13 (Fig. 4) through which the kelly or drill pipe 3 extends and the kelly or pipe is square in cross section and has four flat sides 14. Evidently, the drive opening in the bushing and the kelly or pipe may be of other polygonal shapes and in certain instances the kelly or pipe may be splined or keyed to the driver.

Figure 2:
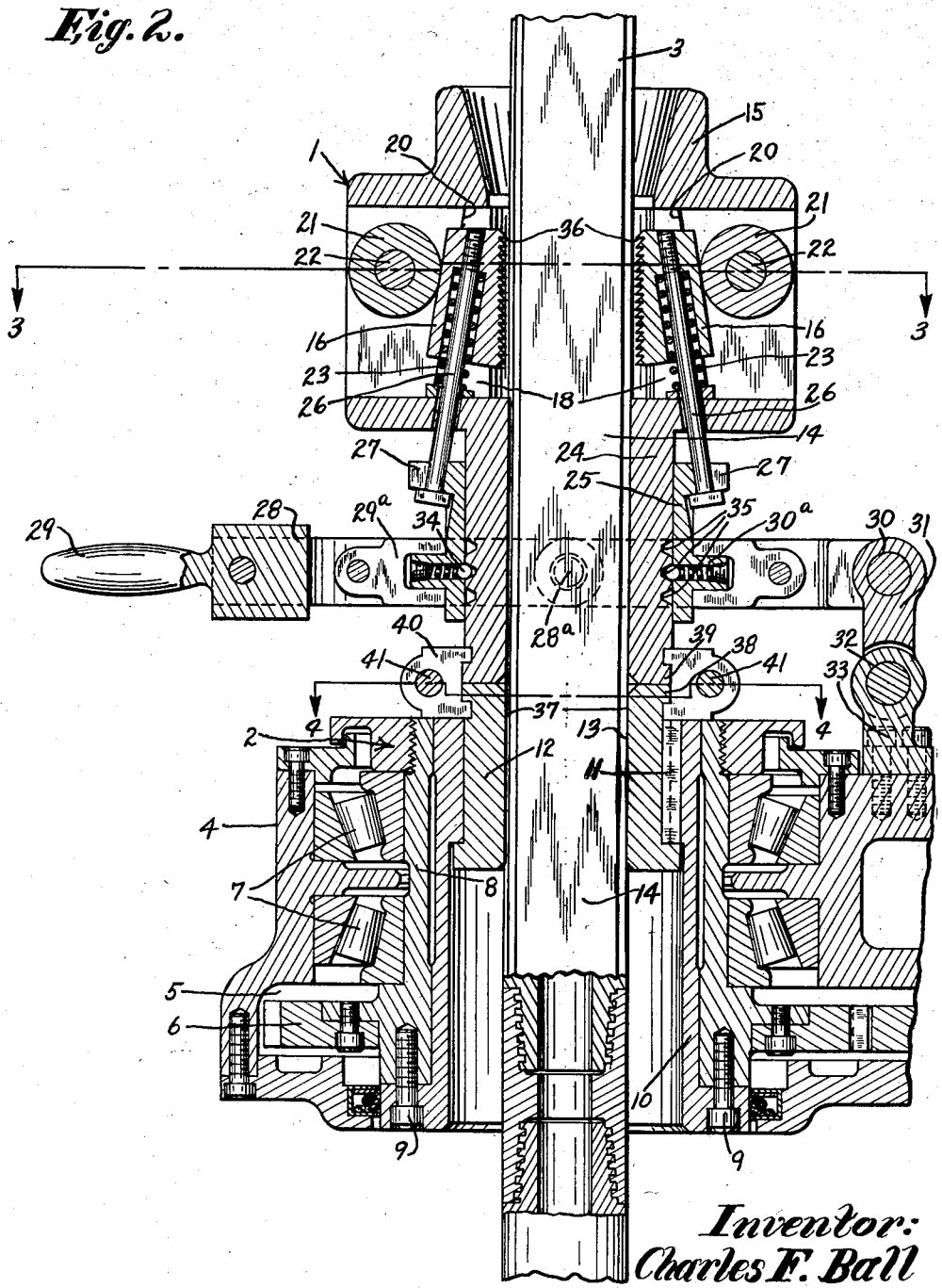
Fig. 2 is a central vertical section taken on line 2—2 of Fig. 1.

The chuck mechanism 1 comprises a casing 15 mounted on the top of the drive bushing 12 of the rotation mechanism, and the chuck and bushing move along a rectilinear path in the manner fully disclosed in the above mentioned patent, and arranged in this casing are pairs of chuck jaws 16 and 17, the pair of jaws 16 being "pull-down" jaws and acting downwardly (Fig. 2) and the pair of jaws 17 being "pull-up" jaws and acting upwardly. The chuck casing has four equally spaced radially located recesses 18 in which the four jaws are arranged (Fig. 3), and the jaws are wedge shaped and have usual gibs 19 slidingly engaging inclined guideways 20 on the chuck casing. The jaws are retained in position with respect to their guideways by backing rollers 21 arranged in the recesses 18 and journaled on cross pins 22 supported within the sidewalls of the recesses. Sets of oppositely acting springs, one set of which is designated 23 in Fig. 2, act on the jaws for urging the latter toward gripping contact with the kelly or drill pipe. Slidingly guided on the lower cylindrical portion 24 of the chuck casing is a shifter ring 25 which is operatively connected to the pairs of jaws, and the operative connection between the pair of jaws 16 and the shifter ring comprises rods 26 secured to the jaws and engaged by lateral ears or lugs 27 on the shifter ring. A ringlike operating lever 28 has a handle 29 and is pivotally mounted at 30 on a link 31, the latter in turn being pivotally mounted at 32 on a bracket 33 secured to the cross frame 4. The lever 28 is pivotally engaged at 28ª with a split collar 29ª embracing a flange 30ª on the shifter ring. A spring pressed ball detent 34 on the shifter ring is selectively engageable with spaced annular grooves 35 on the casing portion 24 for locating the shifter ring in its different adjusted positions. The pivotal connection 28ª between the lever 28 and the collar 29ª provides for relative angular movement therebetween and the link 31 provides a double pivot which affords sufficient freedom of movement between the parts to prevent binding. The annular grooves 35 permit rotation of the chuck casing relative to the shifter lever while the detent is engaged in any one of the grooves. The pairs of jaws have usual teeth or serrations 36 for gripping the flat surfaces of the kelly or drill pipe, and the teeth on the pair of jaws 16 are oppositely directed to the teeth on the other pair. Since this particular jaw structure and the jaw operating means do not per se enter into the present invention, further description thereof is herein unnecessary.

As the kelly or drill pipe 3 is driven by the drive bushing 12 of the rotation mechanism the flat surfaces of the square driver opening move out of parallelism with respect to the flat sides of the kelly or drill pipe, as shown in Fig. 5, due to the fact that there is some clearance between the walls of the opening and the square kelly or pipe. Thus during driving, the driver surfaces engage the kelly or pipe at the four forwardly located points indicated at 37. If the chuck casing were made rigid with the driver, as shown in the Ball and Luce patent mentioned above, the chuck jaws would grip the flat sides of the kelly or pipe preventing relative angular movement between the driver and the kelly or pipe so that the driving surfaces on the driver do not properly engage the flat sides of the kelly or pipe, thus throwing the rotative forces onto the jaws themselves in an undesirable manner. In order to prevent this the chuck is mounted in an improved manner on the driver to permit rotation of the chuck about the axis of driver rotation so that when the driver is in proper driving engagement with the flat sides of the kelly or pipe the chuck jaws will always squarely engage the flat sides of the kelly or pipe, thus avoiding undue strain on the chuck jaws.

In this improved construction, the drive bushing 12 has an upper annular collar or flange 38 while the bottom of the chuck casing is formed with a similar collar or flange 39 and these flanges abut one another and are retained against axial separation by a split retaining ring or collar 40 comprising semi-circular parts held together by cross bolts 41. Evidently, the chuck casing may be rotatably secured to the driver bushing in various other manners. Thus when the flat driver surfaces tilt or cant relative to the flat surfaces of the kelly or pipe, during rotation of the kelly or pipe, the chuck casing may rotate slightly relative to the driver about the axis of rotation of the driver to bring the chuck jaws into proper gripping relation with the kelly or drill pipe. The mode of use of the improved chuck mechanism and the advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. The combination of a rotation mechanism having rotating means including a driver for rotating a kelly, said driver having an opening through which the kelly extends, there being a slight clearance between the walls of said opening and the exterior surface of the kelly, said driver having driving surfaces drivingly engaging complemental surfaces on the kelly for rotating the latter, whereby the driving surfaces of the driver may move out of exact alignment with the engaged complemental surfaces of the kelly as the latter is rotated, a chuck mechanism, and means for rotatably mounting said chuck mechanism on said rotating means for rotation therewith and for limited rotation relative thereto about the axis of rotation of said driver, said chuck mechanism being supported by said rotating means and carrying chuck jaws for engaging the complemental driver engaging surfaces of the kelly irrespective of alignment of said driver surfaces with said complemental driver engaging surfaces of the kelly.

2. The combination of a rotation mechanism having rotating means including a driver for rotating a kelly of polygonal cross section, said driver having a polygonal opening through which the kelly extends, there being a slight clearance between the walls of said opening and the exterior surfaces of the kelly, whereby the flat surfaces of the opening-walls may move out of exact alignment with the flat sides of the kelly as the latter is rotated, a chuck mechanism, and means for rotatably mounting said chuck mechanism on said rotating means above the latter for rotation therewith and for limited rotation relative thereto about the axis of rotation about said driver, said chuck mechanism being carried by said rotating means and carrying chuck jaws for squarely engaging the flat sides of the kelly irrespective of the alignment of the surfaces of the driver opening with the flat sides of the kelly.

3. The combination as set forth in claim 2 wherein said chuck mechanism has bodily movement and its casing is rotatably mounted through said mounting means on the top of said driver and said mounting means includes means for rotatably securing said casing to said driver whereby said casing and driver may rotate and move bodily in unison.

4. The combination of a rotating mechanism having rotating means including a driver provided with an opening through which a kelly extends, said driver upon rotation drivingly engaging the kelly for rotating the latter while permitting axial movement of the kelly relative thereto, a chuck having rotary and bodily movements, and means for rotatably mounting said chuck on said rotating means for rotation therewith and for limited rotation relative thereto about the axis of rotation of said driver, said chuck being supported by said rotating means and having chuck jaws for gripping the kelly, said mounting means including means for rotatively connecting said chuck directly to said driver for rotation and bodily movement in unison therewith.

5. The combination as set forth in claim 4 wherein said mounting means includes an upper annular flange on said driver and a lower annular flange on the casing of said chuck and resting on said driver, and said connecting means comprises a retaining collar rotatively engaging said flanges for securing thte same against axial separation while permitting free relative rotation of said chuck casing and driver.

6. In combination, a rotating mechanism having rotating means for a kelly and having up and down bodily movement, a chuck, means for mounting said chuck for bodily movement upwardly and downwardly in unison with said rotating means and having jaws for engaging the kelly, and means for mounting said chuck on said rotating means for rotation relative thereto about the axial line of said rotating means as determined by engagement of the kelly with said rotating mechanism.

7. The combination as set forth in claim 6 wherein said rotating means includes a driver for engaging the kelly, and said chuck is mounted directly on said driver to rotate therewith during drive, said mounting means for said chuck permitting rotation of said chuck relative to said driver about the axis of rotation of the latter upon driving of tthe kelly, such relative rotation of said chuck and driver being determined by engagement of the kelly with said driver.

8. In combination, a frame movable along a rectilinear path, rotation mechanism having rotating means on said frame and including a driver for rotating a kelly of polygonal cross section, a chuck mechanism, and means for mounting said chuck mechanism for rotation relative to and for movement with said frame, said chuck mechanism being rotatable relative to said driver about an axis aligned with the axis of rotation of said driver, said chuck mechanism being supported on said frame and carrying chuck jaws for gripping the flat sides of the kelly for connecting the latter to said frame for movement therewith, said rotating means and chuck movable in unison with said frame along said rectilinear path, said driver being rotatable about its axis relative to said chuck mechanism to bring said jaws into proper registry with the flat sides of the kelly with said driver concurrently drivingly engaging the flat sides of said kelly.

9. A combination as set forth in claim 8 wherein said chuck mechanism has a casing enclosing said jaws and is supported through said mounting means by said driver and said driver is rotatable relative to said chuck mechanism while movable bodily therewith.

10. In combination, a movable frame, rotation mechanism having rotating means on said frame including a driver for rotating a kelly of polygonal cross section, said driver having an opening through which the kelly extends, there being a slight clearance between the walls of said opening and the exterior surface of the kelly, said driver having driving surfaces drivingly engaging the flat sides of the kelly for rotating the latter whereby the driving surfaces of the driver may move out of exact alignment with the flat sides of the kelly as the latter is rotated, a chuck mechanism, and means for mounting said chuck mechanism for rotation relative to said frame about the axis of rotation of said driver, said chuck mechanism being supported through said mounting means for movement with said frame and carrying chuck jaws for engaging the flat sides of the kelly irrespective of the alignment of said driving surfaces with said flat sides of the kelly.

11. In combination, a movable frame, rotation mechanism having rotating means comprising a driver journaled on said frame and having a polygonal opening for receiving a kelly of polygonal cross section, a chuck mechanism, and means for mounting said chuck mechanism for rotation relative to said frame, said chuck mechanism being supported through said mounting means for movement with said frame and including a chuck casing supported by said driver above the latter and containing chuck jaws engageable with the flat sides of the kelly, said driver opening having its flat walls engageable with the flat sides of the kelly, said driver being rotatable about its axis relative to said chuck mechanism to bring said jaws into registry with the flat sides of the kelly while said driver remains in driving engagement with the kelly.

References Cited in the file of this patent

UNITED STATES PATENTS

| | | |
|---|---|---|
| 1,912,494 | Patterson | June 6, 1933 |
| 2,310,960 | Johansen | Feb. 16, 1943 |
| 2,570,308 | Beeth | Oct. 9, 1951 |
| 2,586,784 | Capp et al. | Feb. 26, 1952 |
| 2,638,324 | Ball et al. | May 12, 1953 |

FOREIGN PATENTS

| | | |
|---|---|---|
| 165,402 | Austria | July 15, 1949 |